Nov. 20, 1934.  L. C. BAILEY  1,981,493
LUBRICATING NOZZLE
Filed Oct. 7, 1932
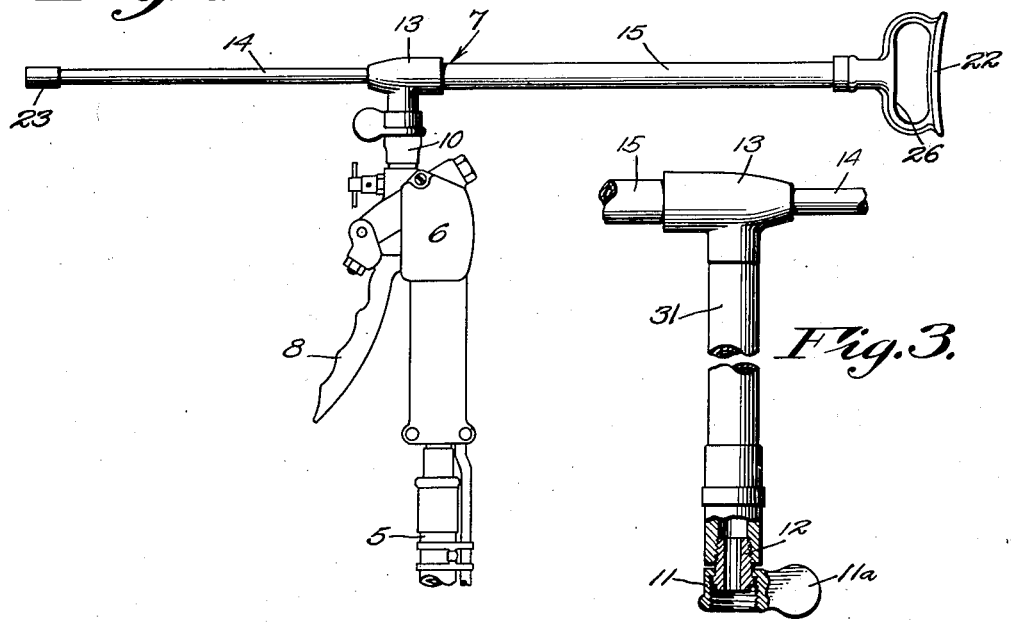
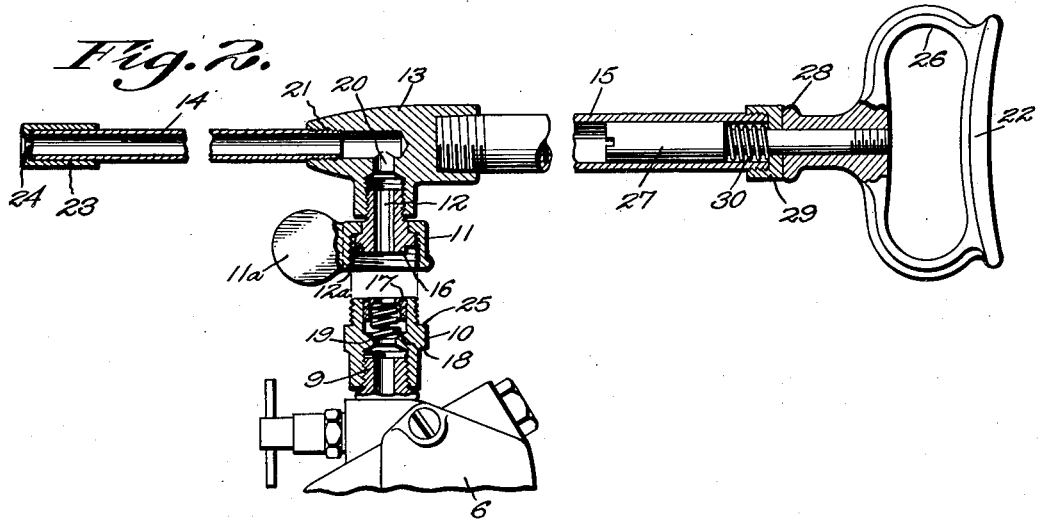
INVENTOR
Louis C. Bailey
BY
Wood & Wood
ATTORNEYS Patented Nov. 20, 1934

1,981,493

UNITED STATES PATENT OFFICE 1,981,493

LUBRICATING NOZZLE

Louis C. Bailey, Seattle, Wash., assignor to The Cincinnati Ball Crank Company, Cincinnati, Ohio, a corporation of Ohio Application October 7, 1932, Serial No. 636,716

6 Claims. (Cl. 221—47.4)

This invention relates to lubricating apparatus and is particularly directed to grease delivery means for supplying those lubricant distributing fittings not equipped with locking or coupling means for attaching the supply nozzle but requiring pressure abutment of the grease delivery nozzle against the fitting. There are two principal forms of valve fittings in use today for lubricating motor car parts, bearing installations and other parts requiring lubrication. As an example of the first form, the pin fitting, as it is conventionally known, generally includes diametrically opposite stud extensions for cooperation with bayonet slots of a coupler or nozzle at the end of a grease supply hose, whereas the abutment type fitting has a tapered or convex end to which a push-on type of nozzle having a cupped or concave outer end is applied under manual pressure during the grease "shot" or discharge.

Heretofore the abutment applied type of nozzle has been in the form of a metal tube held in place against the fitting by means of one hand while the other hand operatively grasped the discharge control valve trigger or handle in the discharge hose.

It is the object of this invention to provide an improved lubricant supply nozzle for the abutment type of fitting, or those types of fittings to which the nozzle is applied under physical force or thrust for holding the nozzle in butt connection during grease supply, which nozzle includes physical thrust or pressure applying means enabling the operator to place body or shoulder pressure against the nozzle for maximum physically applied sealing pressure and which thereby enables the operator to have the use of both hands for other purposes of operation and control after the nozzle has been initially set in abutment with the fitting.

It is a further object of this invention to provide a body pressure or thrust applied lubricant supply nozzle which includes swivelling joints for flexibility of application and which is conveniently adapted to the discharge hose being either coupled directly to the discharge control valve or to a flexible line extension therebeyond and which is quickly interchanged with the attached or lock type of discharge nozzle in current use for pin fittings.

Other objects and further advantages will be more fully apparent from a description of the accompanying drawing, in which:

Figure 1 is a side view of the shoulder applied lubricant supply nozzle.

Figure 2 is a longitudinal sectional view of the nozzle illustrating the details of the stock and barrel as well as the coupling or union for connecting the barrel to the supply hose.

Figure 3 is a fragmentary partial sectional view of the nozzle showing a flexible hose piece connecting it to the supply control valve or coupling thereof.

The shoulder pressure applied lubricant distributing or supply gun nozzle of this invention is attachable at the end of the standard grease supply hose which is usually extended from some type of grease forcing apparatus. A grease flow control valve of conventional make is included in the hose and located adjacent the end thereof for efficient and convenient operation at the point of lubrication.

Referring specifically to the drawing, the hose is generally illustrated at 5, the flow control valve at 6, and the shoulder operated nozzle at 7. The valve 6 is not described in detail except to state that the valve is manually operable by means of a handle or trigger 8 which is operated by gripping the valve body and handle and compressing. The exact nature of this valve is unimportant in the present case, the principal consideration being its relation to the improved nozzle.

The outlet from this valve is by way of an outlet nipple 9 formed as an integral part thereof. A union or coupler element 10 (see Figure 2) is screwed onto this nipple 9 and is designed for cooperation with a companion union or coupler part 11 included as a part of the lubricant supply nozzle assembly 7. The stationary union part 10 includes external screw threads at its outer end and the union part 11 of the nozzle assembly is loosely rotatably mounted on the nozzle assembly and includes internal screw threads cooperating with the external screw threads of the union or coupler part 10.

The rotatable union part 11 includes a wing extension or thumb piece 11ª for manual rotation thereof. This union part is mounted on a nipple 12 screwed into a T union 13 joining the barrel 14 and stock or thrust bar 15 of the lubricant supply gun nozzle 7. The nipple 12 has an annular shoulder 12ª at its outer end supporting the rotatable union or coupling element and disposed within the screw-threaded bore thereof. The lower face of this nipple is counterturned to provide a cylindrical portion 16 fitting within the bore of the fixed union element 10 and abutting a leather cup packing 17. A spring 18 urges the packing against the end face of the cylindrical portion 16 and the packing thereby seals the coupling at this point by engagement with the internal bore of the stationary coupler piece and the end face of the nipple 12. The spring engages an internally formed shoulder 19 in the stationary union part.

The discharge passageway 20 extends into the T union from the nipple 12 and joins a right angle discharge bore extension 21 into which the discharge barrel or tube 14 is screwed. The stock or thrust bar 15 for shoulder application of the barrel is extended from the end of the T union opposite to the barrel and in axial alignment therewith and consists of a tube screwed into the end of the union and a swivelling shoulder brace 22 attached to the outer end of the tube.

The outer end of the barrel 14 is capped by means of a thimble 23 engaged over the end of the tube. The outer end of the thimble is cupped to provide a concave surface for sealing engagement with the usually convex or tapered end of the fitting and includes a central aperture 24 of sufficient size for egress of the grease into the conventional valve controlled bore of the fitting. The fitting is not illustrated herein since its structure is well known in the art.

The coupling parts when assembled permit rotative or swinging movement of the discharge nozzle at this point since the rotatable union or coupling part 11 is screwed tightly against a shoulder 25 and does not rigidly clamp the internal shoulder of the nipple for preventing rotation of the nipple and nozzle assembly. The shoulder brace 22 is shaped to fit snugly against the shoulder and is of open structure for convenient operation by hand, permitting the insertion of the fingers through an opening 26 thereof. This shoulder brace includes a hub in which a stud 27 is secured. This hub has an elongated headed outer end 28 slidably mounted in the tube of the stock.

A cap 29 is screwed onto the outer end of the tube of the stock and the shank of the stud extends through a bore in this cap, the hub of the shoulder pad abutting the cap. A spring 30 is inserted between the cap and the inner end of the elongated head for urging the stud and swivelled shoulder brace inwardly toward the tube and securing a snug working abutment of the shoulder brace with the end of the stock.

As shown in Figure 3, in some instances the present invention may include a section or extension of flexible tubing 31 between the T union 13 of the nozzle and the nipple 12 providing for extreme flexibility between the valve and the improved nozzle.

In handling the present equipment, the operator initially supports the discharge end of the supply hose by holding the valve and trigger in one hand thereby supporting the entire equipment, or he grasps the valve and trigger in one hand and the discharge nozzle in the other by grasping the shoulder brace. In this manner he is able to directly apply the discharge end of the nozzle to the fitting, whereupon he places the weight of his body through his shoulder or his knee or any other convenient contact portion against the shoulder brace and throws a maximum amount of body pressure against the nozzle through the stock and has one hand free for other uses, it being necessary to use only one hand to operate the valve.

By the application of shoulder or body pressure against the nozzle a very efficient seal is secured at the fitting and the wasting of grease which has been constantly occurring in hand pressure application is eliminated. Through the use of the swivel joints the direction of pressure application may be varied to suit the occasion and the position of the fitting. In some instances of fitting arrangement the use of a flexible hose extension 31 is found desirable. Through the use of the coupling it is readily possible to quickly interchange forms of nozzles, that is to say, the pressure applied type as herein set forth may be readily disconnected and the direct positive coupled type quickly attached in place thereof.

Having described my invention, I claim:

1. A lubricant supply device for pressure application to fittings, comprising, a barrel having a rigid outlet adapted to be engaged against the fitting, said barrel having a substantially plain straight bore throughout its length, a stock extending from said barrel, a lubricant supply hose connected to the barrel, and a quick detachable coupling between said barrel and lubricant supply hose.

2. A lubricant supply nozzle for abutment application to fittings, comprising, a barrel having a fixed outlet contact element adapted to engage the fitting, a stock for said barrel including a swivelling pressure applied element for engagement by the body of the operator, a lubricant supply hose, and a quick coupling for attaching said hose to the barrel, said coupling including a swivelling joint.

3. A lubricant supply nozzle for fittings, comprising, a flexible supply hose including a flow control valve therein, a discharge tube connected to said hose and including a fixed outlet end adapted to be sealingly engaged against the fitting, and a stock extended in axial alignment from said tube for application of body pressure to said tube.

4. A lubricant distributing gun nozzle, comprising, a barrel having a fixed discharge end for butt connection with a lubricant distributing fitting and a shoulder engaging thrust bar connecting with and extended longitudinally of the barrel, a supply conduit and a swivelling connection for mounting said nozzle on said conduit.

5. A lubricating device, comprising, a tube having a fixed contact element at one end adapted for butt and sealing engagement with a fitting, said tube having a substantially plain straight bore throughout its length, a force applying element at the other end of said tube for placing body pressure longitudinally of the tube for urging the first end into butt engagement with the fitting, means for coupling a grease supply to said tube, and a control for said grease supply means operable independently of the force applying element.

6. A lubricant supply nozzle for fittings comprising a barrel having a rigid outlet adapted to be engaged against the fitting, a lubricant supply hose connected to said barrel, a valve for controlling the flow of lubricant through said barrel and a thrust bar connected with and extended in axial alignment from said barrel, said thrust bar including a shoulder engaged pad for application of body pressure longitudinally of the thrust bar and the barrel for engaging said rigid outlet against the fitting.

L. C. BAILEY.